Feb. 18, 1964
A. R. JOHNSON ETAL
3,121,759
CASCADE LIQUID-VAPOR REACTOR
Filed Aug. 23, 1960
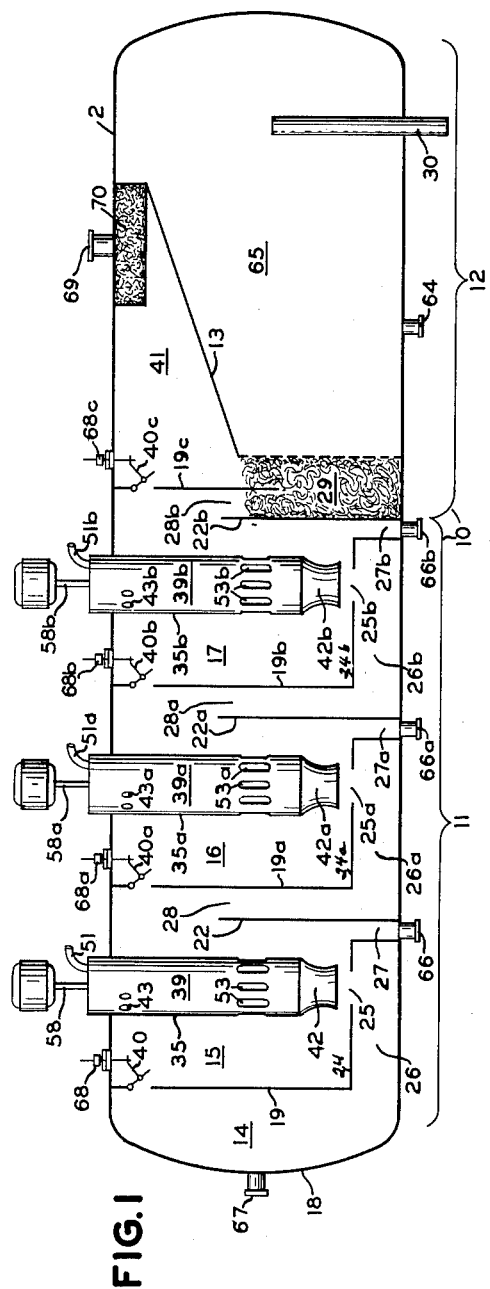
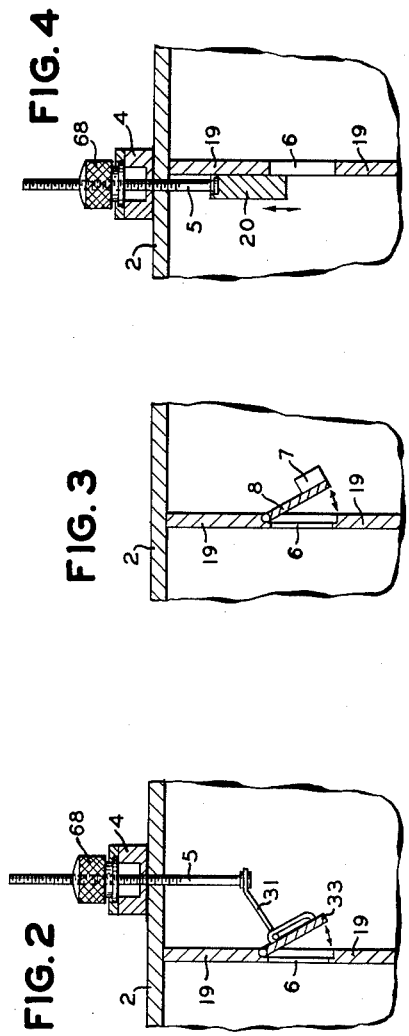
*INVENTORS*
AXEL R. JOHNSON
CHARLES E. SLYNGSTAD
BY *G. H. Palmer*
ATTORNEY
*M. J. Maue*
AGENT

United States Patent Office 3,121,759
Patented Feb. 18, 1964

3,121,759
CASCADE LIQUID-VAPOR REACTOR
Axel R. Johnson, North Babylon, N.Y., and Charles E. Slyngstad, Rutherford, N.J., assignors to The M. W. Kellogg Company, Jersey City, N.J., a corporation of Delaware
Filed Aug. 23, 1960, Ser. No. 51,343
18 Claims. (Cl. 260—683.46)

This invention relates to improvements in contact apparatus for carrying out liquid phase, exothermic reactions in a cascade reactor. More particularly, this invention relates to a cascade type reactor for carrying out the liquid phase alkylation of a hydrocarbon with an olefin in the presence of a liquid acid catalyst wherein lower boiling materials are vaporized during the course of the reaction.

The alkylation of isoparaffins with olefins in the presence of an acid catalyst to produce high quality motor and aviation fuels has been advanced in recent years by contacting the reactants in multi-zone reactors. Some of the reactors particularly suited for this purpose are the cascade type reactors described in U.S. Patent Nos. 2,920,124, 2,927,009 and in Serial No. 9,843. When conducting an alkylation reaction in a cascade type contactor, an increased yield of alkylate is obtained by repeated contact of unconverted isoparaffin with fresh olefin feed in each of the reaction chambers. Also, a remarkably high efficiency is realized with this type of contactor due to the ease and economy with which the reaction conditions can be controlled; as for example, the ability to maintain a constant temperature and pressure in each reaction zone by vaporization and withdrawal of vapors from each of the zones. However, in spite of these advantages, much expense in the contacting apparatus or contactor is incurred in handling the auto-refrigerant vapors generated in this process. Heretofore it has been customary to withdraw the auto-refrigerant vapors from each of the individual reaction zones in the contactor by means of an external piping system, return the vapors to the final downstream reaction zone through pipes to remove the entrained acid droplets therein and finally remove vapors from the contactor after passage through a coalescing zone. It is necessary to individually control the rate at which the vapors are removed from each reaction zone in order to establish and maintain the proper pressure differential between reaction zones and to avoid vapor locking of the reaction mixers or flooding of the reaction compartments due to improper flow of reactants through the zones. However, the external piping required for removal of vapors is expensive and corrosion problems have been known to develop with this type of apparatus, for example, when employing an acid catalyst.

Therefore, it is the purpose of this invention to alleviate or eliminate the difficulties pointed out above by providing an apparatus of improved design.

It is another object of this invention to provide an apparatus of more economic construction design in order to reduce the overall cost of alkylation equipment.

Another object of the present invention is to simplify apparatus requirements of the cascade type reactors.

Another object of this invention is to provide a more efficient multi-zone apparatus adapted to maintain a constant temperature or isothermal conditions in each zone and controlled pressure in the zones of the reaction section.

Still another object of the present invention is to provide a method and apparatus which minimizes the liquid by-pass of a downstream reaction zone.

Further objects and advantages of the present invention will become apparent to one skilled in the art from the following description of preferred embodiments of the apparatus.

Generally the cascade contactor comprises a plurality of adjacent reaction zones arranged in series in the upstream portion thereof and a settling section in the downstream portion of the contactor. The contactor is preferably a cylindrical, horizontally elongated tank. Each of the reaction zones within the contactor is separated from the next zone by an internal metal plate or partition and each of the zones is equipped with a liquid level establishing device usually in the form of a weir over which excess liquid is permited to flow. Communication between zones is provided by passageways which deliver liquid from a proceeding zone to the lower portion of the next succeeding zone. The passageways are preferably vertically elongated and are formed between the zonal separating partitions extending downwardly from the top of the contactor and the liquid level control partition extending upwardly from the bottom of the contactor. Although other liquid transportation means, e.g., a standpipe or valved conduit, may be provided, if desired.

Each zone is equipped with a mixing device which provides agitation and circulation of the reactant mixture in each of the reaction zones. An example of one particularly preferred mixing device comprises an impeller enclosed by a housing inside of which the liquid reaction mixture is passed for intimate contact and from which the resulting liquid product mixture is emitted through a vent located at a point below the liquid level in the zone. In this preferred mixer, the housing is also provided with a plurality of vapor venting means in the upper portion thereof so that vapors formed in the course of the exothermic reaction can be emitted from the housing at a point remote from the liquid ejecting means.

It has been found necessary to provide some way of removing these vapors from the reaction zone in which they are generated and controlling the rate at which they are removed so that the pressure on the liquid in each of the plurality of zones is adjusted to provide a pressure differential between zones which is conducive to the flow of liquid from a first zone, through each of a plurality of succeeding zones, and into the settling section of the contactor.

According to the apparatus in the present invention, each internal zone separating partition is provided with an adjustable port or internal valve means in the upper portion thereof for individually regulating the internal flow of vapor from one zone to the next zone in accordance with the predetermined pressure drop requirements in each zone of the series. The valve means is preferably externally operated to provide adjustability during the reaction and is preferably located and operated on the downstream side of the reaction zone or separating partition. Several types of internal valve means are suitably employed in the present apparaus and some of the preferred types are described in the following figures; however, it should be understood that many modifications and variations of these types will become apparent to one skilled in the art. For example, the valves shown in FIGURES 2 and 4 can be operated from either the upstream or downstream side with the movable parts of the valve also on either side of the zone.

The internal valve means employed in each of the internal zonal separating partitions greatly simplify the cascade reactor apparatus for the reason that all of the external piping formerly required to remove and return vapors from and to the contactor is obviated, thus insuring a more efficient operation and absence from danger of leaks in the piping system. As a consequence of these benefits, it follows that the cost of construction of an alkylation contactor is considerably reduced. It is also found that other benefits are derived from the use of the apparatus of the present invention, particularly in the field of alkylation, since by retaining the vapors in a separate portion of the contactor remote from the liquid, while still controlling the pressure drop between zones, corrosion problems associated with the contactor equipment are almost completely eliminated. The vapors generated in each zone of an alkylation process contain a small amount of entrained liquid. The liquid is acidic in character due to acid employed to catalyze the reaction. Formerly this vapor was removed from each zone and combined in the external piping arrangement, the entrained liquid thereby accumulating in the pipes and causing some degree of corrosion therein. By employing the apparatus of the present invention, however, wherein the vapors are retained in the contactor at a point remote from the liquid therein, the liquid entrained in the vapors is free to separate and return to the liquid phase of the reaction mixture at anytime during residence in the contactor, thus avoiding the accumulative affect of acidic components in the vapor mixture, completely eliminating corrosion in the vapor take-off lines and retaining all of the liquid in the contactor for repeated contact and reaction with olefin feed.

Reference is now had to the following drawing which illustrates the invention, in particular detail, by reference to specific embodiments of the improved apparatus of the invention. It is to be understood, however, the invention is not limited by reference to the specific modifications which follow but is capable of other modifications within the scope of the invention.

In the drawing:

FIGURE 1 is a central vertical section through a contactor employing one embodiment of the adjustable valve of vapor transporting means;

FIGURE 2 is a sectional view of FIGURE 1 illustrating in specific detail, the externally controlled valve assembly employed as vapor transporting means in FIGURE 1;

FIGURE 3 is a sectional view of FIGURE 1 illustrating an internally controlled valve assembly which can be substituted for the valve assembly of FIGURE 2 in FIGURE 1 as vapor transporting means; and FIGURE 4 is a sectional view of FIGURE 1 illustrating another externally controlled valve assembly which can be substituted for the valve assembly of FIGURE 2 in FIGURE 1 as vapor transporting means.

Referring to FIGURE 1, the contactor 10 may be of any convenient shape and size but is preferably in the form of a closed ended cylindrical or approximately cylindrical tank as shown. The contactor 10 is divided by means of a partition 22(b) into a reaction section 11 and a separation or settling section 12. The reaction section 11 as shown, is of approximately the same volume as the settling section 12 but this ratio is subject to wide variation and generally the reaction section, which preferably comprises from five to ten reaction zones, is at least twice the volume of the settling section and may have a volume four or five times large than the settling section.

The reaction section 11 is divided into an entrance chamber 14 and a plurality of reaction chambers; three reaction chambers 15, 16 and 17 being here shown but two, or more than three, for example from five to ten chambers, can be employed as operating conditions require. Each reaction chamber is equipped with a mixing device 35, 35(a) and 35(b) respectively, enclosed by a housing 39, 39(a) and 39(b) respectively. The mixer is adapted to circulate liquid upwardly inside the housing and to expel liquids from vents 53, 53(a) and 53(b) respectively, in the housing at a point below the liquid level in the zone. During the course of reaction inside the mixer, vapors are generated due to the exothermic nature of the reaction. These vapors are expelled from the mixer by ports 43, 43(a) and 43(b) respectively, preferably in an upstream direction into the upper portion of the reaction chamber at a point remote from and above the liquid level in the reaction chamber. Although, in some instances it may be desirable to employ vapor ports completely around the diameter of the housing, it has been found that the disadvantages of liquid entrainment in the vapors is not substantially avoided in this arrangement.

The mixers are actuated by an electrical source which drives an impeller shaft 58, 58(a) and 58(b) respectively, for operation of a propeller (not shown) located in the throat or impeller section 42, 42(a) or 42(b) respectively, of the mixer housing. In the case of alkylation, olefin is introduced to the top of the mixer through a conduit 51, 51(a) and 51(b) respectively, and an emulsion of alkylatable hydrocarbon and acid catalyst is introduced into the bottom of the mixer by means of the propeller and impeller housing and passed upwardly past a point where olefin is uniformly dispersed in the upwardly moving emulsion, said point located below liquid venting means. The mixer is more fully described in copending patent application Serial No. 9,843, in U.S. Patent No. 2,927,009 or U. S. Patent No. 2,920,124.

The entrance chamber 14 is at one end of the contactor 10 and is defined by the dished head 18 of the contactor and the apertured partition 19 depending from the top inner wall of the contactor. The partition 19 or zonal separator has a bottom section thereof removed to provide a port through which material in the chamber 14 may pass for entrance into the bottom of the reaction chamber 15. Reaction chamber 15 is defined by the cylindrical walls of contactor 10 and has one end closed by the apertured partition 19 and the other end by the aperture partition 19(a) also depending from the top inner wall of the contactor. The weir or liquid level establishing means, plate 22 provided adjacent the partition 19(a) has a much larger section removed from its top than partition 19 from its bottom, and is arranged to form a weir which establishes the liquid level in the reaction chamber 15 and thus controls the outflow of liquid materials therefrom. If desired a weir notch (not shown) may be formed in the top of the partition 22 for more accurate liquid level control.

A rectangular plate 24 having an opening 25 therein has one end united to the bottom free edge of the partition 19 and its sides united to the wall of the contactor 10, as by welding, to provide a passageway 26 for flow of liquid material from the bottom of the entrance chamber 14 to substantially the middle region of the bottom of the reaction chamber 15 just below the mouth 42 of mixer 35. A small plate 27 is united to the walls of the contactor 10 and to the end of the rectangular plate 24 to close the end of the passageway 26 so that all the material that enters 26 must pass into the reaction chamber 15, through the opening 25, and into the mouth of mixer 35 for circulation therethrough.

The liquid material expelled from the mixer into the reaction chamber 15 overflows the top edge of the partition 22, then flows down through the downflow passageway 28, formed between the partitions 22 and 19(a) to enter passageway 26(a) and then into the bottom central portion of chamber 16 from opening 25(a) and into mixer 35(a).

The construction of reaction chamber 16 and mixer

35(a) is substantially identical to that of chamber 15 and mixer 35, the corresponding parts of the chamber 16 and the mixer are designated by identical numerals followed by the letter (a), except in the case of the apertured zonal boundary partitions, which are followed by the letters (a) and (b). Thus, the flow of liquid materials is repeated in chamber 16. The reaction chamber 17 and mixer 35(b) is also similar to the chamber 15 and mixer 35, and the corresponding parts thereof have been designated by the identical numerals followed by the letter (b) except in the case of apertured zonal boundary partitions which are followed by the letters (b) and (c). The flow of liquid and vapor through chamber 17 is substantially as described above for chamber 15. The reaction chamber 17, or the final reaction chamber, also differs from the reaction chambers 15 and 16, or preceding reaction chambers, primarily in that in the downstream end thereof, liquid overflowing weir 22(b) enters passageway 28(b) bounded by weir 22(b) and partition 19(c) and then enters a coalescing chamber 29 filled with packing material, bounded by weir 22(b) and perforated partition 32, through which the liquid passes to the liquid separation section 65 of contactor 10. The packing in coalescer 29 can be any suitable material such as glass wool, Raschig rings, wire mesh, etc.

The vapors that are generated in introductory chamber 14 and vapors which are vented from each of the mixers 35, 35(a) and 35(b) through apertures 43, 43(a) and 43(b) respectively, are passed to the next succeeding chamber by means of the adjustable valve assemblies 40, 40(a), 40(b) and 40(c) associated with apertured partitions 19, 19(a), 19(b) and 19(c) respectively. Thus, the vapors are maintained in the upper portion of the contactor, remote from the passage of liquid therethrough; and, at any point along the vapor passage, entrained liquid is continuously separated from the vapors. The passage of vapors is maintained in the same direction as the liquid flow by adjustably controlling the vapor outlet of the apertured partitions so that the pressure in the series of zones is decreased by controlled increments in the direction of flow. In this way, a pressure differential is maintained between the chambers to facilitate the series flow of the reactants through the chambers 14, 15, 16 and 17 and particularly so that the liquid reaction mixture of lower density than the liquid material in the bottom of the next zone will flow into the mixer of the next succeeding chamber.

The vapors in the final reaction chamber of the contactor are passed, in the upper portion of the contactor through a valve 40(c) associated with apertured partition 19(c), into a vapor-liquid separating zone defined by the walls of the contactor, partition 19(c) and inclined plate 13, which extends over the liquid separating section 65 in the contactor, connecting vapor coalescing chamber 70 with liquid coalescing chamber 29 and prevents the vapors from mixing with said liquid. The vapors then pass through coalescing chamber 70 and are withdrawn from the contactor by means of outlet nozzle 69. In coalescer 70, the entrained liquid is separated from the vapor and returned to the liquid phase in liquid coalescer 29 by means of the deflector plate 13.

The total liquid from coalescing chamber 29 is then passed to settling section 12 wherein the heavy acid phase is separated from the lighter hydrocarbon phase and is withdrawn from the contactor by means of outlet 64. The settling section 12 is divided, by deflector plate 13, into a vapor chamber 41 and the liquid settling chamber 65. The top edge of the standpipe 30 is at a somewhat higher level than the top edge of the opposed perforated plate 32 of the coalescer 29. The liquid reaction material as it passes through the coalescer 29 separates into an acid and a liquid hydrocarbon layer and settling of the two phases takes place in the liquid settling chamber 65. The lighter liquid hydrocarbon being the top layer, overflows standpipe 30 through which it is withdrawn from the contactor for further processing, while the heavier acid settles in the bottom of the acid chamber 65. The acid is removed through the pipe nozzle 64 in the bottom of the liquid settling chamber 65 and a portion of this acid is preferably recycled to the contactor through nozzle 67. The hydrocarbon withdrawn from the contactor 10 is then subjected to the usual refinement steps including neutralization and deparaffinization in order to recover pure alkylate.

The chambers 15, 16 and 17 are each provided with a nozzle 66 to facilitate the removal of residual material from the respective sections during cleaning, etc. The chamber 14 is provided with a nozzle 67 through which liquid materials, in the case of alkylation of isoparaffin hydrocarbon or isoparaffin in admixture with acid catalyst may be introduced into contactor 10. The isoparaffin feed may also contain hydrocarbons boiling below the reactant. Chamber 15 can also include a nozzle (not shown) through which acid catalyst is supplied to the contactor 10 and mixer 35 when not supplied in admixture with isoparaffin or to supplement the volume of acid introduced in admixture with isoparaffin to nozzle 67.

As set forth above various valve assemblies can be employed to individually control the pressure in the reaction chambers of the contactor and passage of vaporous material, generated in the reaction, from one chamber to the next in the direction of liquid flow by establishing a pressure differential between the reaction chambers. A detailed drawing of the particular valve employed in FIGURE 1 is shown by FIGURE 2 wherein 19 indicates the partition extending from the top inner wall 2 of contactor 10, said partition having a port 6. The effective area of port 6 is adjustably controlled by moving, relative to port 6, displaceable closure member 33, which is designed to cover said port. The closure member 33 has its upper end pivotly mounted on partition 19 at the upper end of port 6 and its lower end pivotly connected to the lower end of traveling arm 31, said closure member also has a vertical slot in its lower extremity along which traveling arm 31 is free to move in a vertical direction. The closure member 33 is actuated by traveling arm 31 which is pivotly connected at its upper end to threaded valve stem 5. Valve stem 5 extends through operating handle 68 which bears against closing bonnet 4 so that by turning handle 68, stem 5 is raised or lowered causing arm 31 to elevate or depress closure member 33 at varying degrees of open or closed position by pivoting and traveling along the vertical slot in closure member 33.

The above valve and the valve shown in FIGURE 4 are externally controlled so that the pressure in the reaction zone can be varied during operation, if desired. The valve of FIGURE 4 operates on the same principle as the valve in FIGURE 2 with regard to raising and lowering of the valve stem by means of handle 68 and bonnet 4. However, in FIGURE 4 the valve stem 5 is equipped with an enlarged, elongated head 20 which is adapted to seal off port 6 by sliding downwardly over it. Head 20 and valve stem 5 are vertically movable in a plane parallel to partition 19 and head 20; engages partition 19 at at least the portion above port 6, as when in open position, and engages partition 19 at the portion above and below port 6 when closed. Thus, the valve of FIGURE 4 eliminates the pivotly mounted arm and closure member of the valve described above and is, therefore, more simplified in design.

The valve shown in FIGURE 3 illustrates an internally controlled, pressure actuated valve means. The closure means 8, which is hinged to partition 19 at the top of port 6 is loaded with a mass of predetermined weight so that closure means 8 is forced to open to the degree necessary to emit, to the next zone, only vapor in excess of that required to maintain a predetermnied pressure drop from the upstream zone. As the pressure increases in the upstream zone, the force of the vapor exerted against closure member 8, is sufficient to overcome the force of the weight 7 and the pressure in the adjacent downstream zone, urging closure member 8 to closed position and, due to this pressure differential between the zones, vapors are automatically emitted through port 6 at a rate necessary to maintain the constant predetermined pressure in the upstream reaction zone. It is to be understood, however, that weight 7 can be adjusted to meet the specific requirements of the particular zone as shown by the dotted lines in FIGURE 3. Weight 7 is conveniently a metal bar, but can also be a liquid or other solid weighted member. The operation of this particular valve is not adjustable during the reaction in the contactor and is, therefore, the simplest in design of those shown.

It is to be understood that FIGURES 2 through 4 represent only a few of the numerous valve closure means which can be employed in the design of contactor 10. For example, the opening of port 6 can be a contractable diaphragm comprising a series of converging and overlapping leaves or plates, as in an iris type closure, which can be turned by a ring so as to change the diameter of the central opening and the ring can be externally controlled. Also partition 19 may have a port located at the very top of the contactor with externally operated closure means acting as a plunger or stopper to seal off said port when desirable. Innumerable possibilities will become apparent from the above drawings and description without departing from the scope of this invention, particularly in regard to more involved or complicated adjustable valve means which, for the sake of brevity, have been omitted from the above discussion.

In order to more clearly describe the invention of the present apparatus, and by way of example, the operation of a particular process which can be conducted in such apparatus is discussed as it applies to alkylation.

Generally, the reaction of an isoparaffin with an olefin in the presence of an acid catalyst is carried out at a temperature of between about 0° F. and about 200° F., preferably between about 25° F. and about 100° F.; under a pressure of from about atmospheric to about 150 p.s.i.g., preferably from about 5 p.s.i.g. to about 50 p.s.i.g.; a mole ratio of isoparaffin to olefin between about 2:1 and about 400:1 or higher, preferably at least 150:1; and a volume per hour of olefin per volume of acid catalyst between about 0.01:1 and about 0.5:1, preferably between about 0.04:1 and about 0.4:1. The conditions are somewhat higher in the alkylation of an aromatic compound, for example benzene, with an olefin and generally a temperature of between about 350° F. and about 480° F. and a pressure of from about 500 p.s.i.g. to about 700 p.s.i.g., is employed. To maintain a high reaction rate, the alkylation temperature for a given system is preferably as high as liquid phase reacting conditions will permit and this temperature depends upon the boiling points of the compounds which may be present in the alkylation reactant mixture such as, for example, propane, isobutane, n-butane, isopentane, pentane, neopentane, ethylene, propylene, butylene, isobutylene, amylene, toluene and benzene. When employing the contacting apparatus of the present invention, the vapors which are generated during the reaction are maintained in the upper portion of the reaction zone and in the upper portion of the contactor away from the inlet of the mixing means so that the body of liquid in the reaction zone is superimposed by a body of vapor. The vapors are withdrawn from one zone near the uppermost portion of the zone to minimize the entrainment of liquid in the vapors and passed to the next downstream zone in the series. The vapor removed from each zone through the adjustable port of the zonal separating partitions is controlled to provide a pressure drop of between about 0.5 p.s.i. and about 10 p.s.i., preferably at least 1 p.s.i. between each of two adjacent zones of the contactor.

An example of the apparatus and method of the present invention as applied to an alkylation unit of 1150 barrels per stream day capacity is given below.

*Example*

A mixture of 92–93 percent sulfuric acid and isobutane in a mole ratio of about 4:1 is fed to introduction zone 14. The isobutane feed contains a minor amount of lower and higher boiling materials such as ethane, propane and normal butane; and since the temperature in zone 14 is maintained at 55° F., and the pressure in zone 14 is controlled at 24 p.s.i.g., a portion of this mixture (about 5 percent) is vaporized to further cool the incoming feed. Valve 40 is adjusted to maintain the aforementioned pressure in introduction zone 14; thus, about 75 moles per hour of vapor is passed to reaction zone 15 which is maintained at a pressure of 22 p.s.i. by proper adjustment of valve 40(a). The liquid material is passed through passageway 26 through opening 25 and into the impeller section 42 of mixer 35. In the impeller section, the acid catalyst and isobutane are emulsified by a propeller attached to drive shaft 58 which is connected to an electrical motor. The emulsion is passed upwardly to a point below liquid venting means 53 where it is uniformly contacted with the olefin feed entering the mixer 35 from conduit 51, in a mole ratio of about 200:1 isobutane to olefin. The olefin feed comprises a mixture of isobutylene, propylene and n-butylene. This reaction mixture undergoing conversion is then passed upwardly in mixer 35 by means of internal elongated take-off passageways which are usually a series of vertically elongated pipes located within the mixer housing and terminating below vapor venting means 43. The liquid leaving the vertically elongated pipes is then passed downwardly inside of the mixer housing and ejected from the housing by means of ports 53 below the liquid level in reaction zone 15. The vapors generated during the reaction are vented in an upstream direction from the housing through ports 43, and valve 40(a), which is regulated to control the pressure in zone 15 at 22 p.s.i. and is opened to emit about 250 moles per hour of vapors to the next downstream reaction zone 16, which is maintained at a pressure of 19 p.s.i. by means of valve 40(b). The liquid in zone 15 containing alkylate product rises above the level of weir 22 and overflows into passageway 28 into passageway 26 from which the liquid mixture is introduced into reaction zone 16 by means of opening 25(a) and the procedure outlined in the previous reaction zone is again repeated. In zone 16, the vapors vented from ports 43(a) in mixer 35(a), which are generated as a result of contact of the unreacted emulsion reaction mixture with fresh olefin feed and additional conversion to alkylate, are then passed to the next downstream reaction zone 17 which is maintained at a pressure of 16 p.s.i. by means of valve 40(c). The liquid mixture in zone 16 is permitted to overflow weir 22(a), enter passageway 28(a) and 26(b) from which it is introduced into reaction zone 17 through opening 25(b). In reaction zone 17 the emulsion is again contacted with fresh olefin feed in mixer 35(b) as described above in reaction zone 15. The vapors generated in mixer 35(b) are vented through ports 43(b), and valve 40(c), which is adjusted to maintain a pressure of 16 p.s.i.g. in zone 17, is opened to emit about 600 moles per hour of vapor through the port of partition 19(c) into vapor separating section 41. The vapor in vapor separating section 41, at a pressure of 15 p.s.i.g., is then passed through coalescer 70 and removed from the contactor through nozzle 69. A portion of these vapors can be cooled and recompressed for introduction with the liquid feed, if desired. The liquid product mixture, containing about 15 percent of alkylate, after being ejected from mixer 35(b) through ports 53(b), overflows weir 22(b) and enters passageway 28(b). The downwardly flowing alkylate mixture then enters coalescer 29 wherein it is de-emulsified and is passed to liquid settling section 65 through perforated plate 32. Any liquid material separated from vapors in section 41 by means of coalescer 70 is admixed with the alkylate product mixture in coalescer 29 by means of return deflector plate 13. The de-emulsified liquid entering chamber 65 then separates into two layers, an acid layer and a hydrocarbon layer. The acid layer, being the heavier, settles to the bottom and is withdrawn from the contactor by means of nozzle 64. A portion or all of this acid may be recycled to the reactor as the acid catalyst. The upper layer, or hydrocarbon layer containing the alkylate, overflows standpipe 30 and is thus withdrawn from the contactor. This hydrocarbon mixture contains the high quality alkylate of the process and is passed through a series of refinement steps, such as neutralization, deisobutanization, de-n-butanization and redistillation to recover the alkylate fractions boiling within the desired range from said liquid mixture. Generally, it has been found beneficial to recycle the isoparaffin recovered from the subsequent refinement to the alkylation contactor as at least part of the feed thereto.

In the above example, the temperature in the contactor is maintained constant in each zone and the overall alkylation temperature in the contactor varies between about 50° F. and about 55° F. The rate of flow of liquid from zone to zone varies from 7,000 barrels per stream day to 10,000 barrels per stream day, while the amount of gases passed from zone to zone is varied in accordance with the pressure requirements of the individual reaction zones. At all times during the operation of the process, the gaseous phase is maintained in the upper portion of the contactor, remote from the liquid phase. The above process results in a 99 percent yield, based on reactant conversion, of high quality alkylate having an F-1 octane number of about 95.

The above example is offered as a better understanding of the present invention and is not to be construed as unnecessarily limiting thereto for it can be readily seen that the alkylation of other materials (e.g., propylene, amylene, benzene, etc.), and exothermic processes other than alkylation, for example, extraction of butylene, wherein butylene is extracted with sulfuric acid; halogenation of hydrocarbons, wherein, for example, hydrogen chloride is reacted with an olefin to produce a chloro-olefin; nitration of a paraffin with nitric acid and sulfonation of an olefin or an aromatic compound can be carried out in the above apparatus with equally beneficial results.

Having thus described our invention we claim:

1. In a cascade alkylation contactor the combination which comprises: a horizontally elongated tank having a plurality of contiguous series arranged reaction chambers separated one from the other by internal apertured partitions; internal valve means associated with said apertures for regulating the passage of a vaporous material, in a downstream direction, from one chamber to the next through said apertures in the upper internal portion of the contactor; and liquid level establishing means in the lower portion of each chamber for passing a controlled amount of liquid material in a downstream direction, from one chamber to the next in series, remote from the passage of said vapors.

2. In a closed, horizontally elongated contactor which is divided into a reaction section and a separation section and wherein the reaction section contains a plurality of contiguous, series arranged reaction chambers, each separated from the other by transverse dividing means; and means for passing a liquid in series from one chamber to the succeeding chamber; each of said reaction chambers having a liquid level establishing means and a mixing device; means to separate vapors from liquid and direct vapors to the upper portion of the chamber above said liquid level the improvement wherein said dividing means comprises: a transverse partition extending downwardly from the top of the contactor, said partition having a vapor port positioned in the upper section thereof above the liquid level establishing means for passing vapors in a downstream direction to the next chamber in an area separate from said passage of liquid, and adjustable closing means associated with said port whereby the effective area of said port is adjusted to provide an opening diameter for emission of vapors in a controlled amount sufficient to maintain said reaction chambers, in the downstream direction, at progressively decreasing pressures.

3. In a closed, horizontally elongated contactor which is divided into a reaction section and a separation section and wherein the reaction section contains a plurality of contiguous, series arranged reaction chambers, each separated from the other by transverse dividing means; and means for passing a liquid in series from one chamber to the bottom portion of a succeeding chamber; each of said reaction chambers having a liquid level establishing means and a vertically disposed mixing device adapted to pass a liquid reaction mixture in an elliptical flow path below the liquid level in the chamber and to separate and direct vapors to the upper portion of the chamber above said liquid level the improvement wherein said dividing means comprises: a transverse partition extending downwardly from the top of the contactor, said partition having a vapor port positioned in the upper section thereof above the liquid level establishing means for passing vapors in a downstream direction to the next chamber in an area separate from said passage of liquid, said port being disposed in opposition to vapors vented from said mixer, and adjustable closing means associated with said port whereby the effective area of said port is adjusted to provide an opening diameter for emission of vapors in a controlled amount sufficient to maintain said reaction chambers, in the downstream direction, at progressively decreasing pressures.

4. The apparatus of claim 3 wherein said closure means is an externally operated valve.

5. The apparatus of claim 3 wherein said closure means is an internally operated preset valve.

6. In a closed, horizontally elongated contactor for effecting liquid phase exothermic reactions resulting in partial vaporization of components which contactor is divided into a reaction section and a separation section and wherein the reaction section contains a plurality of contiguous, series arranged reaction chambers separated from each other by transverse dividing means; and means for passing a liquid to the bottom portion of a chamber from a higher level in a preceding chamber; each of said reaction chambers having a liquid level establishing means extending upwardly into the reaction chamber from the bottom of the contactor and a vertically disposed propelling and mixing device adapted to separately expel vaporous and liquid materials at remote points in the chamber, the improvement wherein said dividing means comprises: a transverse partition extending downwardly from the top of the contactor wall below the liquid level establishing means, said partition having a vapor port positioned in the upper section thereof above the liquid level establishing means for passing vapors in a downstream direction to the next chamber in an area separate from said passage of liquid, said port being disposed in opposition to vapors vented from said mixer; adjustable closing means associated with said port whereby the effective area of said port is so adjusted to provide an opening of sufficient diameter for emission of vapors from the upstream side of said port to the downstream side of said port in an amount to maintain said reaction chambers, in the downstream direction, at controlled and progressively decreasing pressures in order to promote continuous flow of liquid from one chamber to the next in series throughout the contactor, and means for adjusting said closure means.

7. In a closed, horizontally elongated contactor for effecting liquid phase exothermic reactions resulting in partial vaporization of components which contactor is divided into a reaction section and a separation section and wherein the reaction section contains a plurality of contiguous, series arranged reaction chambers separated from each other by transverse dividing means; and means for passing a liquid to the bottom portion of a chamber from a higher level in a preceding chamber; each of said reaction chambers having a liquid level establishing means extending upwardly into the reaction chamber from the bottom of the contactor and a vertically disposed propelling and mixing device enclosed by a housing with an inlet mouth adjacent the bottom of the chamber, liquid venting means in said housing located below the liquid level in the chamber and vapor venting means located at the top of said housing and above the liquid level in the chamber, said mixing device adapted to pass a liquid reaction mixture entering said chamber successively upwardly and downwardly therethrough and to separately expel vaporous and liquid materials at remote points in the chamber, the improvement wherein said dividing means comprises: a transverse partition extending downwardly from the top of the contactor wall below the liquid level establishing means, said partition having a vapor port positioned in the upper section thereof above the liquid level establishing means for passing vapors in a downstream direction to the next chamber in an area separate from said passage of liquid, said port being disposed in opposition to vapors vented from said mixer; adjustable closing means associated with said port whereby the effective area of said port is so adjusted to provide an opening of sufficient diameter for emission of vapors from the upstream side of said port to the downstream side of said port in an amount to maintain said reaction chambers, in the downstream direction, at controlled and progressively decreasing pressures in order to promote continuous flow of liquid from one chamber to the next in series throughout the contactor, and means for adjusting said closure means.

8. The apparatus of claim 7 wherein said closure means is a weighted flapper valve pivotly mounted on said partition at the top of said port.

9. The apparatus of claim 7 wherein said closure means is a vertically movable plate adapted to cover said port in said transverse partition.

10. In a process for the liquid phase alkylation of an alkylatable hydrocarbon with an olefin in the presence of an acid catalyst in a plurality of reaction zones within a contactor wherein the reaction temperature is controlled near the boiling point of the alkylatable hydrocarbon by an auto-refrigerative cooling provided by vaporization of low boiling components during reaction in each of said plurality of reaction zones and wherein the liquid reaction mixture is induced to flow from one reaction zone to a succeeding reaction zone the improvement which comprises: separating the vapors generated in each reaction zone in the upper portion of the zone to form a liquid reaction mixture superimposed by a blanket of auto-refrigerant vapors; and maintaining a controlled pressure drop between adjacent reaction zones, which pressure decreases in the direction of liquid flow, by withdrawing a controlled amount of vapor from each zone and passing said vapor to the next zone in series in the upper internal portion of the contactor remote from the liquid phase therein.

11. In a process for the liquid phase alkylation of an alkylatable hydrocarbon with an olefin in the presence of an acid catalyst in a plurality of reaction zones within a contactor wherein the reaction temperature is controlled near the boiling point of the alkylatable hydrocarbon by an auto-refrigerative cooling provided by vaporization of low boiling components during reaction in each of said plurality of reaction zones and wherein the liquid reaction mixture is induced to flow from a high point in one reaction zone to a low point in a succeeding reaction zone the improvement which comprises: separating the vapors generated in each reaction zone in the upper portion of the zone to form a liquid reaction mixture superimposed by a blanket of auto-refrigerant vapors; and maintaining a controlled pressure drop between adjacent reaction zones, which pressure decreases in the direction of liquid flow, by withdrawing a controlled amount of vapor from each zone and passing said vapor to the next zone in series in the upper internal portion of the contactor remote from the liquid phase therein.

12. In a process for the liquid phase alkylation of an alkylatable hydrocarbon with an olefin in the presence of an acid catalyst in a plurality of reaction zones within a contactor wherein the reaction temperature is controlled near the boiling point of the alkylatable hydrocarbon by an auto-refrigerative cooling provided by vaporization of low boiling components during reaction in each of said plurality of reaction zones and wherein the liquid reaction mixture is induced to flow from a high point in one reaction zone to a low point in a succeeding reaction zone the improvement which comprises: separating the vapors generated in each reaction zone in the upper portion of said zone to form a liquid reaction mixture superimposed by a blanket of auto-refrigerant vapors; maintaining a controlled pressure drop between adjacent reaction zones, which pressure decreases in the direction of liquid flow, by withdrawing a controlled amount of vapor from each zone and passing said vapor to the next zone in series in the upper internal portion of the contactor remote from the liquid phase therein; continuously separating entrained liquid from the vapor during residence in the zone and transportation between zones and simultaneously returning said separated liquid to said liquid phase in said contactor.

13. The process of claim 12 wherein the pressure drop between adjacent reaction zones is at least 1 p.s.i.

14. The process of claim 12 wherein the pressure drop between adjacent reaction zones is between about 0.5 p.s.i. and about 10 p.s.i.

15. The process of claim 12 wherein the liquid mixture, together with liquid recovered from the vapors, is emulsified and recontacted with fresh olefin feed in the next succeeding reaction zone.

16. The process of claim 12 wherein the pressure drop between pairs of adjacent zones varies by a different amount, but is maintained at a minimum of at least 1 p.s.i.

17. In a cascade alkylation contactor the combination which comprises: a horizontally elongated tank having a plurality of contiguous, series arranged, reaction chambers each containing a liquid level establishing means and a mixer enclosed by a housing with vapor vent means in the upper portion of the housing, said chambers being separated one from the other by internal apertured partitions, internal valve means associated with said apertures for regulating the passage of a vaporous material in a downstream direction from one chamber to the next through said apertures in the upper, internal portion of the contactor and in opposition to vapors vented from said housing, said liquid level establishing means in the lower portion of each chamber disposed for passing a controlled amount of liquid material in a downstream direction from one chamber to the next in series remote from the passage of said vapors.

18. In a process for the liquid phase alkylation of an alkylatable hydrocarbon with an olefin in the presence of an acid catalyst in a plurality of enclosed mixing zones each contained in a separate reaction zone within a contactor, wherein the reaction temperature is controlled near the boiling point of the alkylatable hydrocarbon by auto-refrigerative cooling provided by vaporization of low boiling components during reaction in each of said plurality of mixing zones, wherein vaporized low boiling materials are vented from the top of the mixing zones and wherein the liquid reaction mixture is vented from the lower portion of the mixing zones and is induced to flow from one reaction zone to a succeeding reaction zone, the improvement which comprises: separating the vapors generated in each reaction zone and vented from each mixing zone in the upper portion of the reaction zone to form a liquid reaction mixture superimposed by a blanket of autorefrigerant vapors; and maintaining a controlled pressure drop between adjacent reaction zones, which pressure decreases in the direction of liquid flow, by withdrawing a controlled amount of vapor from each reaction zone and passing said vapors to the next reaction zone in series in the upper internal portion of the contactor remote from the liquid phase therein and in a direction resistant to vapors being vented from the mixing zone in the reaction zone to which the vapors are being delivered.

References Cited in the file of this patent

UNITED STATES PATENTS

| | | |
|---|---|---|
| 2,710,790 | Rupp et al. | June 14, 1955 |
| 2,768,987 | Hart | Oct. 30, 1956 |
| 2,927,009 | Stiles et al. | Mar. 1, 1960 |

FOREIGN PATENTS

| | | |
|---|---|---|
| 804,966 | Great Britain | Nov. 26, 1958 |

UNITED STATES PATENT OFFICE
CERTIFICATE OF CORRECTION

Patent No. 3,121,759                      February 18, 1964

Axel R. Johnson et al.

It is hereby certified that error appears in the above numbered patent requiring correction and that the said Letters Patent should read as corrected below.

In the grant, lines 2 to 4, for "assignors to The M. W. Kellogg Company, of Jersey City, New Jersey, a corporation of Delaware," read -- assignors to Pullman Incorporated, a corporation of Delaware, --; line 13, for "The M. W. Kellogg Company, its successors" read -- Pullman Incorporated, its successors --; in the heading to the printed specification, lines 4 to 6, for "assignors to The M. W. Kellogg Company, Jersey City, N. J., a corporation of Delaware" read -- assignors to Pullman Incorporated, a corporation of Delaware --.

Signed and sealed this 9th day of February 1965.

(SEAL)
Attest:

ERNEST W. SWIDER                          EDWARD J. BRENNER
Attesting Officer                             Commissioner of Patents